US 6,575,054 B2

(12) United States Patent
Sugiyama et al.

(10) Patent No.: US 6,575,054 B2
(45) Date of Patent: Jun. 10, 2003

(54) CORE BAR FOR STEERING WHEELS

(75) Inventors: Toshiyuki Sugiyama, Shizuoka (JP); Kazuhiro Kaneko, Shizuoka (JP); Mikio Ochiai, Shizuoka (JP); Kazuyoshi Nishijima, Shizuoka (JP); Kevin Dominic Delaney, Avondale (IE)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/819,889

(22) Filed: Mar. 29, 2001

(65) Prior Publication Data

US 2001/0027697 A1 Oct. 11, 2001

(30) Foreign Application Priority Data

Mar. 30, 2000 (JP) ........................ 2000-095936
Mar. 30, 2000 (JP) ........................ 2000-095937

(51) Int. Cl.⁷ .............................. B62D 1/04; G05G 1/10
(52) U.S. Cl. ........................................................ 74/552
(58) Field of Search .......................................... 74/552

(56) References Cited

U.S. PATENT DOCUMENTS

| 1,088,999 | A | * | 3/1914 | Kormendy | .................... | 74/552 |
| 1,473,189 | A | * | 11/1923 | Knubel | ........................ | 74/552 |
| 1,629,075 | A | * | 5/1927 | Geyer | ........................... | 74/552 |
| 2,814,211 | A | * | 11/1957 | Hoagg | ........................... | 74/552 |
| 3,172,683 | A | * | 3/1965 | D'Antini | ..................... | 74/552 |
| 3,800,620 | A | | 4/1974 | Barenyi | ........................ | 74/552 |
| 4,598,002 | A | | 7/1986 | Kimura | ........................ | 428/36 |
| 4,800,775 | A | * | 1/1989 | Iuchi | ......................... | 29/894.1 |
| 4,892,006 | A | * | 1/1990 | Endo et al. | ................. | 29/894.1 |
| 5,243,877 | A | * | 9/1993 | Numata | ....................... | 280/731 |
| 6,065,366 | A | * | 5/2000 | Koyama et al. | ............. | 156/293 |
| 6,216,556 | B1 | * | 4/2001 | Koyama et al. | ............. | 156/293 |
| 6,279,419 | B1 | * | 8/2001 | Testa et al. | .................... | 74/552 |
| 6,282,982 | B1 | * | 9/2001 | Testa | ............................. | 74/552 |
| 6,386,063 | B1 | * | 5/2002 | Hayashi et al. | ................ | 74/552 |
| 2001/0006011 | A1 | * | 7/2001 | Testa et al. | .................... | 74/552 |
| 2001/0025546 | A1 | * | 10/2001 | Sugiyama et al. | ............ | 74/552 |
| 2002/0023517 | A1 | * | 2/2002 | Ochiai et al. | .................. | 74/552 |

FOREIGN PATENT DOCUMENTS

| JP | 57-158158 | | 9/1982 | | |
| JP | 60-060065 | | 4/1985 | | |
| JP | 63205221 | * | 8/1988 | .................. | 74/552 |
| JP | 1197168 | * | 8/1989 | .................. | 74/552 |
| JP | 03268934 | * | 11/1991 | .................. | 74/552 |
| JP | 03-271068 | | 12/1991 | | |
| JP | 3287465 | * | 12/1991 | .................. | 74/552 |
| JP | 5147536 | * | 6/1993 | .................. | 74/552 |
| JP | 5178214 | * | 7/1993 | .................. | 74/552 |
| JP | 06-047382 | | 6/1994 | | |

* cited by examiner

Primary Examiner—Christopher P. Schwartz
Assistant Examiner—Devon Kramer
(74) Attorney, Agent, or Firm—Foley & Lardner

(57) ABSTRACT

A core bar for a steering wheel includes an upper shell and a lower shell coupled to the upper shell. Each half shell includes a boss core-bar portion coupled to a steering shaft, a rim core-bar portion, and a spoke core-bar portion interposed between the two. An insertion is received in a hollow defined by the upper and lower shells.

17 Claims, 9 Drawing Sheets

CORE BAR FOR STEERING WHEELS

BACKGROUND OF THE INVENTION

The present invention relates to a core bar for steering wheels.

Typically, the core bar for steering wheels is formed, for example, by bending and welding of an iron bar material, or by integral casting of a magnesium alloy material, etc. However, the use of an iron material increases a mass of the core bar to make a weight reduction difficult. Particularly, for the type with an air bag device mounted, a steering wheel is of greater mass in its entirety. On the other hand, the use of a lightweight alloy material such as magnesium alloy enables a weight reduction, but produces difficulty of reducing a manufacturing cost due to expensive material and required finish machining for flash and surface.

Under such circumferences, JP-A 57-158158 and JP-A 60-60065 propose the structure wherein two half members each obtained by press forming a steel plate are butt-welded to form a hollow core bar. The structure having butt-welded half members allows a reduction both in mass due to use of a relatively thin steel plate and in complexity of finish machining due to application of press forming.

With the hollow core bar, it is easy to achieve a weight reduction, but difficult to improve an operation feel by restraining vibrations because a resonance point is apt to move down. Moreover, in the case of a steering wheel arranged in an inclined way, a weight reduction of the steering wheel in its entirety tends to move a weight balance to the driver's side or downwardly. Then, a weight called dynamic damper can be mounted to the steering wheel to restrain resonance of the steering wheel produced by engine vibrations, etc., which complicates a manufacturing process, leading to increased manufacturing cost.

SUMMARY OF THE INVENTION

It is, therefore, an object of the present invention is to provide a core bar for steering wheels, which exhibits reduced weight and excellent weight balance, and allows easy achievement of anti-resonance.

The present invention generally provides a core bar for a steering wheel mounted to a steering shaft, comprising:
a first half shell;
a second half shell coupled to the first half shell,
each half shell comprising a boss portion coupled to the steering shaft, a rim portion, and a spoke portion interposed between the boss portion and the rim portion; and
an insertion received in a hollow defined by the first and second half shells.

One aspect of the present invention is to provide a core bar for a steering wheel mounted to a steering shaft, comprising:
a first half shell;
a second half shell coupled to the first half shell,
each half shell comprising a boss portion coupled to the steering shaft, a rim portion, and a spoke portion interposed between the boss portion and the rim portion; and
a weight received in a hollow formed between the first and second half shells at at least one of the boss portion, the rim portion, and the spoke portion.

Another aspect of the present invention is to provide a core bar for a steering wheel mounted to a steering shaft, comprising:
a first half shell;
a second half shell coupled to the first half shell,
each half shell comprising a boss portion coupled to the steering shaft, a rim portion, and a spoke portion interposed between the boss portion and the rim portion; and
a reinforcement arranged throughout a hollow formed between the first and second half shells at the rim portion and the spoke portion.

A further aspect of the present invention is to provide a core bar for a steering wheel mounted to a steering shaft, comprising:
a first half shell;
a second half shell coupled to the first half shell,
each half shell comprising a boss portion coupled to the steering shaft, a rim portion, and a spoke portion interposed between the boss portion and the rim portion; and
means for filling at least part of a hollow defined by the first and second half shells.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
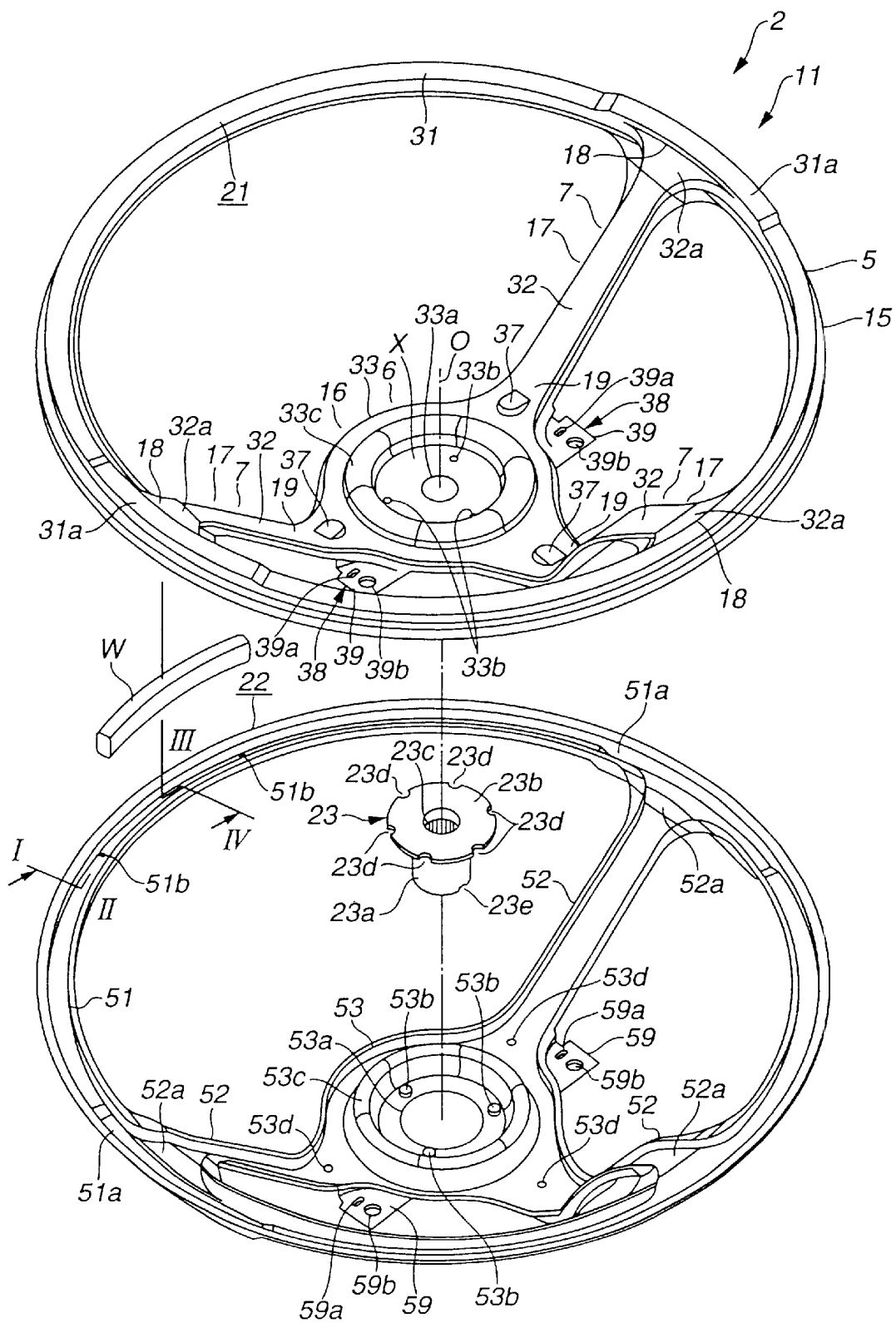
FIG. 1 is an exploded perspective view showing an embodiment of a core bar for a steering wheel according to the present invention.

Referring to the drawings, preferred embodiments of a core bar for steering wheels are described in detail.

Figure 2:
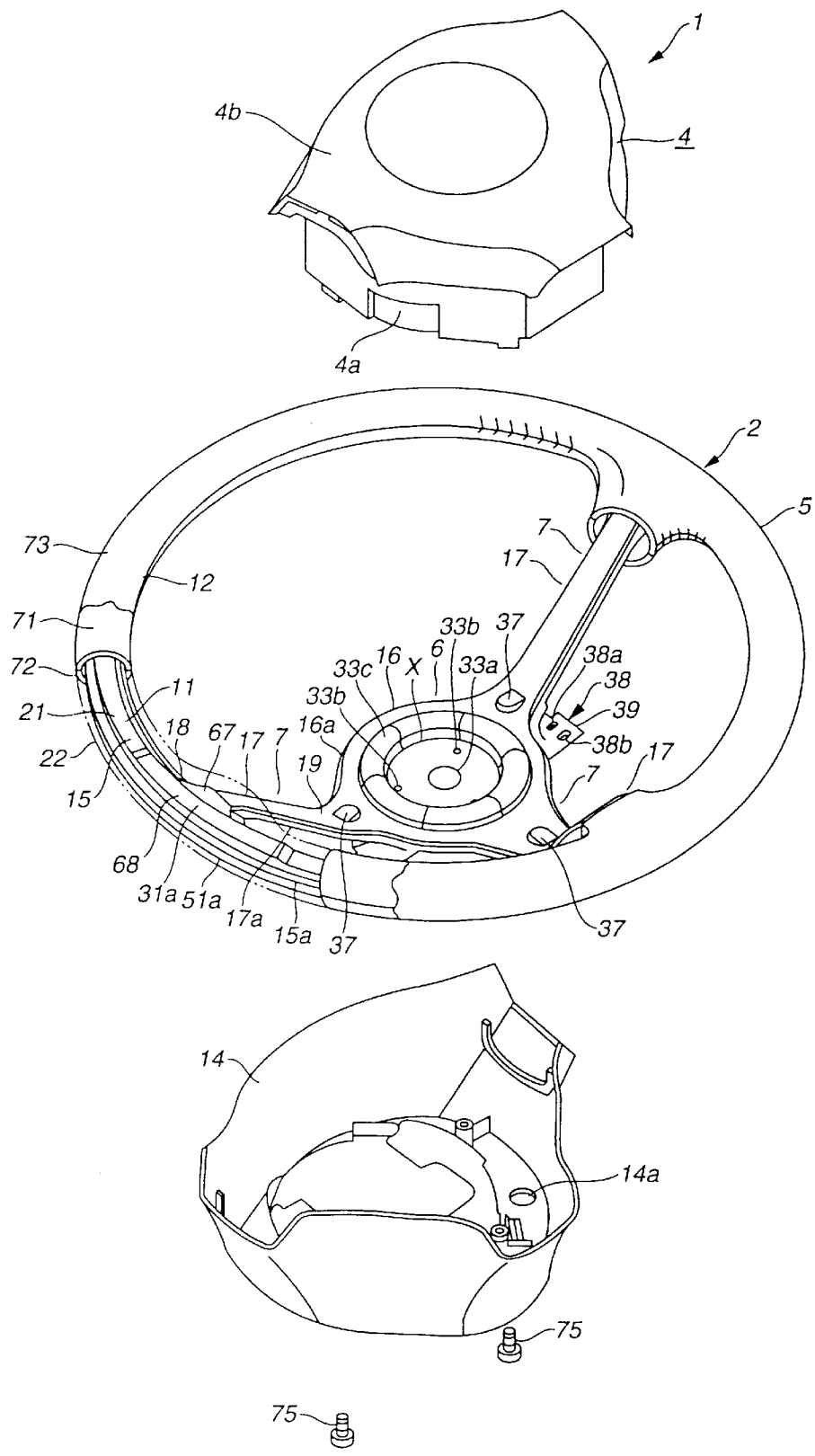
FIG. 2 is a view similar to FIG. 1, partly broken, showing the steering wheel with a core bar.

Referring to FIG. 2, a steering wheel for an automotive vehicle, designated by reference numeral 1, comprises a main body 2, an air bag device or module 4 as a center pad mounted to the main body 2 on the side of a driver or an occupant, etc. The steering wheel 1 is mounted to a steering shaft or a course-guiding shaft arranged on the vehicle-body side. Typically, the steering shaft is provided in a vehicle in an inclined way. For the steering wheel 1, refer hereafter the occupant or air bag-device 4 side or the front side to as upper side, the side opposite to the occupant side, i.e. the vehicle-body or steering-shaft side or the reverse side to as lower side, the vehicular forward or front-glass side to as front side, and the vehicular backward or lower rearward side to as rear side. Refer also an axis of the steering shaft to as an operation axis O.

The steering-wheel main body 2 is substantially annular in entire shape, for example, and comprises a rim 5 called also grip or ring for holding operation, a boss 6 placed inside the rim 5, and a plurality of (three in this embodiment) spokes 7 for connecting the rim 5 and the boss 6. The steering-wheel main body 2 also comprises a core bar 11, a sheath 12 for partly covering the core bar 11, and a lower cover 14.

Referring to FIGS. 1–3, the core bar 11, which can be called wheel core bar, is of the shape corresponding to the entire shape of the steering-wheel main body 2, and comprises a rim core-bar portion 15, a boss core-bar portion or a boss plate portion 16 placed inside the rim core-bar portion 15, and a plurality of (three in this embodiment) spoke core-bar portions 17 for connecting the rim core-bar portion 15 and the boss core-bar portion 16. By combining an upper or first-half shell 21 facing the occupant and a lower or second-half shell 22 facing the vehicle body, a hollow A is defined by the insides of the rim core-bar portion 15 and the spoke core-bar portion 17. A weight W is fixedly received in the hollow A. The rim core-bar portion 15 and the spoke core-bar portion 17 form a tube with closed section. A boss body 23 constituting a shaft fixing part is fixed to the boss core-bar portion 16 with the top partly placed inside the hollow A. Refer hereafter a connection between the rim core-bar portion 15 and the spoke core-bar portion 17 to as an outside connection 18, and a connection between the boss core-bar portion 16 and the spoke core-bar portion 17 to as an inside connection 19.

The upper and lower shells 21, 22 are obtained by press forming of a steel plate, each being integrally formed by, e.g. a 1.0 mm thickness SPCE steel plate as deep drawn. The upper and lower shells 21, 22 are coupled to each other at a rim-edge coupling 15a along the outer and inner peripheries of the rim core-bar portion 15, a spoke-edge coupling 17a along both ends of the spoke core-bar portion 17, and a boss-edge coupling 16a along the outer periphery of the boss core-bar portion 16.

The upper shell 21 includes a rim top 31, spoke tops 32, and a boss top 33. A circular hole 33a is formed in the center of the boss top 33. A plurality of, e.g. three, protrusions 33b is equidistantly formed on the perimeter of a circle with the circular hole 33a as center so as to protrude downwardly. Moreover, a junction or a circular protrusion 33c having substantially U-shaped section is concentrically formed at the outer periphery of the circle with respect to the protrusion 33b so as to protrude upwardly. The inner periphery of the junction 33c is disposed lower than the outer periphery. Upwardly protruding seats 37 are formed at both sides and the rear of the boss top 33 so as to restrict the height of the air bag device 4.

The spoke tops 32 are extended upwardly inclinedly from both sides and the rear of the boss top 33. Each spoke top 32 is of the width roughly constant along the longitudinal direction, and includes, in the vicinity of the outside connection 18, an upper spoke core-bar large-diameter portion 32a having width smoothly continuously enlarged toward the outside connection 18. The rim top 31 is of the annular shape as viewed in plan, and includes, in the vicinity of the outside connections 18 at both sides of the boss top 33, upper rim core-bar large-diameter portions 31a having greater height than the other portion. In the vicinity of the inside connections 19 formed at both sides of the boss top 33, brackets 39 are continuously integrated with the boss top 33 and the respective spoke tops 32 to constitute mounting seats 38. Each bracket 39 is shaped like a horizontal plate, and has pluralities of through holes 39a, 39b.

Figure 3A:
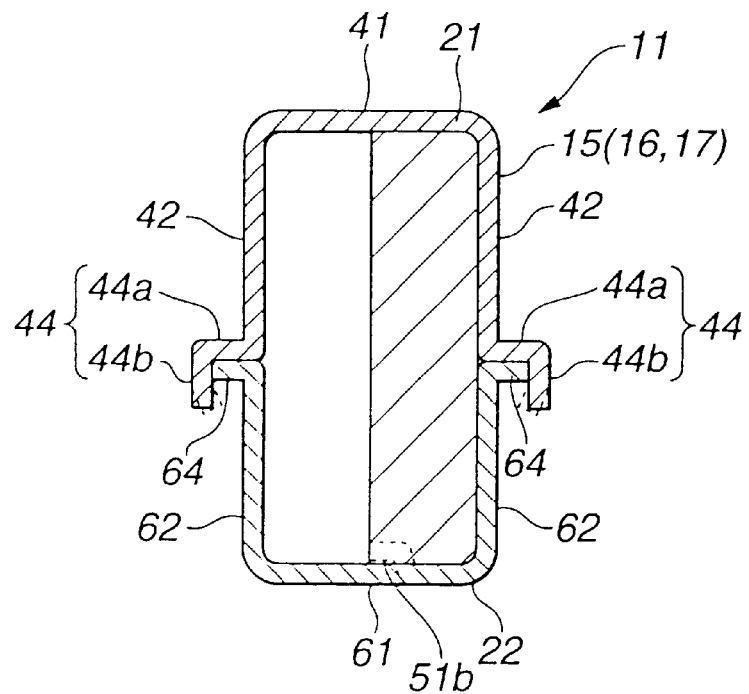
FIGS. 3A–3B are sectional views, each taken along the line I–II–III–IV in FIG. 1.

Referring to FIG. 3A exemplarily illustrating the rim core-bar portion 15, an edge of each of the rim top 31, the spoke tops 32, and the boss top 33 includes a plate-like base 41 and vertical walls 42 extending downwardly from respective edges of the base 41. Continuously formed at a lower end of each vertical wall 42 is a plastically deformable embracement 44 which comprises a horizontal-plate-like upper flange 44a and a fastening 44b extending from an outer edge of the upper flange 44a.

In the similar way to the upper shell 21, the lower shell 22 includes a rim bottom 51, spoke bottoms 52, and a boss bottom 53. A circular hole 53a having larger diameter than that of the circular hole 33a of the boss top 33 is formed in the center of the boss bottom 53. A plurality of, e.g. three, protrusions 53b is equidistantly formed on the perimeter of a circle with the circular hole 53a as center so as to protrude upwardly. The protrusions 53b are disposed 60° offset with respect to the protrusions 33b of the boss top 33, respectively. Moreover, a circular junction 53c having substantially U-shaped section is concentrically formed at the outer periphery of the circle with respect to the protrusion 53b so as to protrude upwardly. For accommodation or engagement in the junction 33c of the boss top 33, the junction 53c of the lower shell 22 is of smaller outer diameter and larger inner diameter than those of the junction 33c. Holes 53d are formed in the vicinity of the respective inside connections 19, i.e. at both sides and the rear of the boss top 33 so as to correspond to the respective seats 37 of the boss top 33. A self-tapping screw, not shown, is meshed with each hole 53d.

The spoke bottoms 52 are extended upwardly inclinedly from both sides and the rear of the boss bottom 53. Each spoke bottom 52 is of the width roughly constant along the longitudinal direction, and includes, in the vicinity of the outside connection 18, a lower spoke core-bar large-diameter portion 52a having width smoothly continuously enlarged toward the outside connection 18. The rim bottom 51 is of the annular shape as viewed in plan, and includes, in the vicinity of the outside connections 18 at both sides of the boss top 33, lower rim core-bar large-diameter portions 51a having greater height than the other portion. A pair of protrusions or weight positioning parts 51b is formed in predetermined positions of the rim bottom 51, e.g. in front end positions of the rim bottom 51, i.e. in the most distant positions from the outside connections 18 each as a connection with the spoke bottom 52 in this embodiment. In the vicinity of the inside connections 19 formed at both sides of the boss top 33, brackets 59 are continuously integrated with the boss bottom 53 and the respective spoke tops 52 to constitute the mounting seats 38. Each bracket 59 is shaped like a horizontal plate, and has a plurality of through holes 59a, 59b.

Referring to FIG. 3A, an edge of each of the rim bottom 51, the spoke bottom 52, and the boss bottom 53 includes a plate-like base 61 and vertical walls 62 extending upwardly from respective edges of the base 61. A horizontal-plate-like flange 64 is continuously formed at an upper end of each vertical wall 62. The length between outer ends of the flanges 64, 64 of the lower shell 22 is smaller than that between inner side faces of the fastenings 44b, 44b of the upper shell 21.

As shown in FIG. 1, the boss body 23 is formed by applying an iron material to forging, casting, or numerically controlled (NC) machining using an NC machine tool. The boss body 23 comprises an integration of a roughly cylindrical-shaped tube 23a and a roughly disc-shaped boss flange 23b obtained, for example, by cutting of an S15C-equivalent steel material. A protrusion or a serration 23c is formed at the inner periphery of the tube 23a to mesh with an undulated protrusion formed at the outer periphery of a head of the steering shaft. Six semicircular notches 23d are equidistantly formed at the outer periphery of the boss flange 23b. Moreover, a cancellation or a rectangular recess 23e is formed at a lower end of the tube 23a to engage with a canceling pin for automatically returning an operation lever for a direction-indicator lamp mounted to a steering column, not shown.

The weight W includes a circular bar having a curvature equal to that of the rim core-bar portion 15 and a rectangular section. The weight W is in the form of an iron block obtained by casting or the like so as to fill the hollow A of the rim core-bar portion 15 partly circumferentially and fully diametrally or sectionally. Although the weight W can be made of lead, nickel, and copper in terms of the mass increasing function, it is preferably made of iron in terms of the recycle.

The core bar 11 is constructed by butting the upper and lower shells 21, 22 with the boss body 23 held therebetween. In the manufacturing process of the core bar 11, the boss body 23 is disposed between the boss top 33 of the upper shell 21 and the boss bottom 53 of the lower shell 22, and the weight W is disposed between the rim top 31 and the rim bottom 51 and between the weight positioning parts 51b. Then, the upper and lower shells 21, 22 are placed one upon another. At this time, the tube 23a of the boss body 23 is protruded downwardly from the circular hole 53a of the boss bottom 53, and the boss flange 23b is held between the boss top 33 and the boss bottom 53. Moreover, the protrusions 33b, 53b are alternately engaged with the six notches 23d of the boss flange 23b from above and below, carrying out positioning of the upper and lower shells 21, 22 and the boss body 23 in the direction of rotation.

Figure 3B:
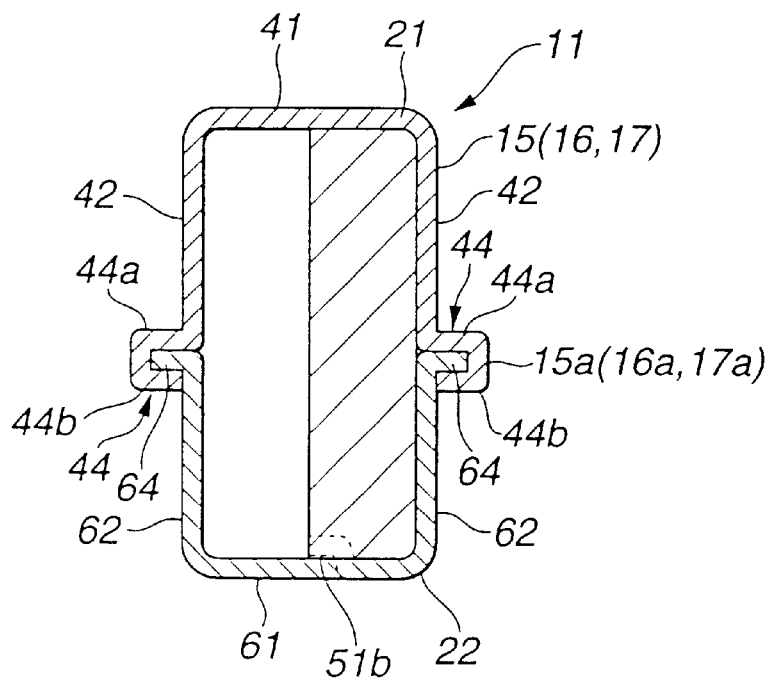

Referring to FIG. 3A, with the upper and lower shells 21, 22 placed one upon another, each flange 64 arranged along an edge of the lower shell 22 is received in the embracement 44 arranged along an edge of the upper shell 21. Then, the fastening 44b of the embracement 44 is subjected to hemming to couple the upper and lower shells 21, 22. Specifically, by hemming using an automatic machine, the fastening or vertical wall 44b is inclined inwardly as illustrated by the broken line in FIG. 3A, then bent and deformed by applying a force thereto up to the lower face of the flange 64 of the lower shell 22 so as to envelop parallel the flange 64 as shown in FIG. 3B, coupling the upper and lower shells 21, 22. The rim core-bar portion 15 and the spoke core-bar portion 17 form a tube with closed section to define the hollow A therein. For circumferential detent for upper and lower shells 21, 22, the rim core-bar coupling 15a of the rim core-bar portion 15 can be formed with concavities or engagements obtained by punching at predetermined intervals.

The weight W is held by the upper and lower shells 21, 22, and is positioned and fixed by the longitudinal ends abutting on the weight positioning parts 51b.

With the boss core-bar portion 16, the upper and lower junctions 33c, 53c are closely engaged to receive one in another, and are fixed without being joined with each other so as to form a middle weakness X which is deformable by an external force and placed inside the junctions 33c, 53c and outside the boss body 23. The section of the weakness X is of smaller height and larger width, i.e. smaller in height along the direction of the operation axis O and larger in width in the direction perpendicular to the direction of the operation axis O compared with the section of the hollow defined by the rim core-bar portion 115 and the spoke core-bar portion 117. The boss body 23 is fixed to the lower shell 22 in predetermined positions by spot welding or the like. The boss body 23 can be fixed to both of the upper and lower shells 21, 22 instead of being fixed to one of them.

Moreover, as shown in FIG. 2, a spoke core-bar large-diameter portion 67 is configured in the spoke core-bar portion 17, which is continuously connected to the outside connection 18 to which the rim core-bar portion 15 and the spoke core-bar portion 17 are coupled, and has larger sectional area with larger width. And a rim core-bar large-diameter portion 68 is configured in the rim core-bar portion 15, which is continuously connected to the outside connection 18 and has larger sectional area with greater height.

Furthermore, the upper and lower brackets 39, 59 are aligned and placed one upon another to obtain the mounting seat 38. The mounting seat 38 is formed with a positioning hole 38a communicating with the through holes 39a, 59a, and a mounting hole 38b communicating with the through holes 39b, 59b.

The sheath 12 and the lower cover 14 are mounted to the core bar 11 as shown in FIG. 2 so as to obtain the steering-wheel main body 2. The sheath 12 includes upper and lower rim covers 71, 72 which partly envelop the rim core-bar portion 15 and the spoke core-bar portion 17. The upper and lower rim covers 71, 72 are obtained by injection molding of polypropylene resin, for example. Moreover, the whole of the rim covers 71, 72 is covered with a skin material 73 of, e.g. natural leather such as cowhide or artificial leather wound and seamed at the outer periphery, as required.

The lower cover 14 is integrally formed, e.g. out of synthetic resin to have the shape allowing partial covering of the boss core-bar portion 16 and the spoke core-bar portion 17. The lower cover 14 is mounted to the lower shell 22 by inserting the self-tapping screws into the respective through holes from below and engaging them with the respective holes 53d of the lower shell 22. Each seat 37 of the upper shell 21 facing the corresponding hole 53d of the lower shell 22 serves to prevent a threaded part of the self-tapping screw from abutting on the upper shell 21 even if the threaded part protrudes upwardly from the hole 53d. Moreover, the lower cover 14 has working through holes 14a facing the mounting seats 38 of the core bar 11.

The airbag device 4 comprises a metal base plate 4a, an unillustrated bag-like airbag and inflator for supplying gas thereto, mounted to the base plate 4a, and a cover 4b concealing the airbag and capable of being broken by the pressure provided when the airbag develops. The base plate 4a includes a pair of nut portions having downward tapped hole, and positioning protrusions placed in the proximity of the nut portions. The airbag device 4, which is placed on the boss core-bar portion 16 of the core bar 11, has the base plate 4a abutting on the seats 37 of the upper shell 21 for positioning in the height direction, and positioning protrusions inserted in the respective positioning holes 38a of the mounting seats 38 for positioning in the horizontal or cross direction. With the upper and lower through holes 39a, 59a constituting the positioning hole 38a, the through hole 59a of the lower shell 22 is larger than the through hole 39a of the upper shell 21 to prevent the lower shell 22 from contacting and interfering with the positioning protrusion inserted in the through hole 39a. By engaging bolts 75 inserted from below through the working through holes 14a with the respective nut portions of the base plate 4a through the mounting holes 38b of the mounting seats 38, the airbag device 4 is fixed to the steering-wheel main body 2 to obtain the steering wheel 1.

Next, operation of the illustrative embodiment is described. The steering-wheel main body 2 of the steering wheel 1 having three spokes 7 has a center of gravity positioned on the rear side in the forward or neutral position, i.e. on the lower side in the state that it is mounted to the steering shaft as inclined. Likewise, the airbag device 4 has a center of gravity positioned below the operation axis O as center of rotation of the steering-wheel main body 2 in the state that it is mounted to the steering-wheel main body 2. Thus, the center of gravity of the steering wheel 1 in its entirety is positioned below the operation axis O. Due to strength requirement for quick development of the airbag, the airbag device 4 is greater in weight than the pad with impact absorber, etc.

On the other hand, in this embodiment, the weight W is arranged in the rim core-bar portion 15 of the rim 5 producing the greatest centrifugal force by rotation, resulting in easy achievement of excellent balance at rotational operation.

Moreover, due to the center of gravity being close to the center of rotation, the airbag device 4 can be balanced by the weight W with relatively small mass, minimizing an increase in mass of the steering wheel 1.

Furthermore, the weight W, which is shaped to be capable of being received in the hollow A, does not involve the outer dimension of the rim core-bar portion 15 at all, allowing the design of the rim 5 to be suitable for holding operation, resulting in improved operation feel. Moreover, with this configuration, the weight W requires no change in structure of the upper and lower rim covers 71, 72, facilitating mounting work of the rim covers 71, 72, resulting in a reduction in manufacturing cost. In place of the sheath 12 in the form of the rim covers 71, 72 which are preformed in a predetermined shape, the sheath 12 may be a polyurethane-foam sheath integrally formed around the core bar 11 by insert molding. Even when adopting the polyurethane-foam skin, arrangement of the weight W requires no reduction in thickness of the skin, providing no bottoming feel so called occurring due to insufficient thickness, leading to excellent conservation of the touch quality.

Further, the external shape of the weight W corresponds to the internal shape of the hollow A, i.e. the weight W is of the shape complementary to that of the hollow A, allowing effective use of an inside space of the hollow A. This also contributes to a reduction in area to be occupied in plane and a concentration of the mass at a desired position, resulting in easy balancing of the mass.

The hollow A can be formed in any of the rim 5, the boss 6, and the spokes 7. The hollow A is formed, preferably, in the rim 5, and more preferably, in the rim 5 and the spokes 7, and most preferably, in the core bar 11 in its entirety, including also the boss 6. The weight W is disposed by using a space in the core bar 11, having no effect on the external shape of the core bar 11, allowing arrangement in any position in the hollow A of the core bar 11. That is, the weight W can be disposed not only in the rim 5, but in the spoke 7 or the boss 6.

When disposing the weight W in the rim 5 or the spoke 7, the weight W is placed at the outer periphery with respect to the center of rotation, providing suitable balancing of rotation, resulting in easily operable steering wheel 1 with high visual quality.

When disposing the weight W in the rim 5, the weight W is placed at the outermost periphery with respect to the center of rotation, providing most suitable balancing of rotation. In this case, the weight W is placed preferably in the most distant position from connections with the spokes 7, e.g. in the front end portion as in the illustrative embodiment, because the spokes 7 are unevenly spaced along the circumference of the rim 5 in view of operability of the steering wheel 1 and visibility of the meters.

When disposing the weight W in the boss 6, the weight W occupies only a small space, facilitating its layout in connection with other parts such as a pad, leading to a reduction in size of the steering wheel 1 in its entirety. Moreover, since the boss 6 forms a starting point for vibrations which propagate from the vehicle body to the steering wheel 1 in its entirety via the steering shaft, arrangement of the weight W in the boss 6 can effectively reduce vibrations in the middle of propagation.

In any of the above configurations for the weight W, since the weight W is disposed inside the core bar 11 shaped like a closed-section tube, sure fixing of the weight W can be achieved by simple mounting structure compared with the configuration wherein the weight W is secured to the outside of the core bar 11, resulting in reduced manufacturing cost.

The core bar 11 is of the shell structure having the upper and lower shells 21, 22 oppositely joined, providing a weight reduction and a sufficient strength. Preferably, each shell 21, 22 is obtained by press forming of a plate material, which allows formation of a half shell with final geometric elements through less number of processes. The final shape of the core bar 11 can be produced by combining the half shells, providing significantly simplified manufacturing process and largely streamlined material flow handling so called, resulting in reduced manufacturing cost.

In such a way, this embodiment provides the steering wheel 1 comprising the core bar 11 and the sheath 12 for covering the core bar 11 wherein the minimum weight W is provided in the hollow structure. This allows a reduction in weight of the core bar 11, and thus in the steering wheel 1 in its entirety including this lightweight core bar 11. Moreover, a mass balance of the core bar 11 can readily be established, leading to easy adjustment of a mass balance of the steering wheel 1. Furthermore, the resonance frequency for the core bar 11 can be increased to effectively restrain the resonance of vibrations of the steering wheel 1. Further, the core bar 11 is easy to manufacture, leading to reduced manufacturing cost.

In the event of vehicular collision, the airbag device 4 is operated to develop the airbag in front of the driver or occupant so as to restrain him or her thrown forward, alleviating a collision impact to be applied.

In the event that the occupant collides with the steering wheel 1 regardless of actuation of the airbag device 4, the core bar 11 can be deformed or self-aligned, absorbing a collision impact. At this time, the core bar 11 provides a greater strength, since the outer periphery of the boss core-bar portion 16 is reinforced by the junctions 33c, 53c, the rim core-bar portion 15 and the spoke core-bar portion 17 continuously connecting the junctions 33c, 53c form a tube with closed section, and the embracement coupling structure provides a rib structure. Moreover, the spoke core-bar large-diameter portion 67 and rim core-bar large-diameter portion 68 having increased sectional area are formed at the outside connection 18 to which the rim core-bar portion 15 and the spoke core-bar portion 17 are coupled, and the spoke core-bar large-diameter portion 67 is shaped like a soft sector to increase the sectional area, allowing restrained concentration of a stress on the outside connection 18. This results in excellent shape conservationability of the steering-wheel main body 2 in its entirety. Then, an outer peripheral edge of the boss flange 23b of the boss body 23 of the boss core-bar portion 16 functions as the weakness X, which is deformed intensively to change the angle at the base, as it were, of the spoke core-bar portion 17 with the entire shape conserved with respect to an external force, absorbing a collision impact, achieving excellent impact absorbing characteristics for the core bar 11.

In the illustrative embodiment, the weight W is engaged and positioned between the weight positioning parts 51b preformed with any of the shells 21, 22 of the core bar 11. Positioning of the weight W can be carried out by various means in place of or with the weight positioning parts 51b.

Figure 4:
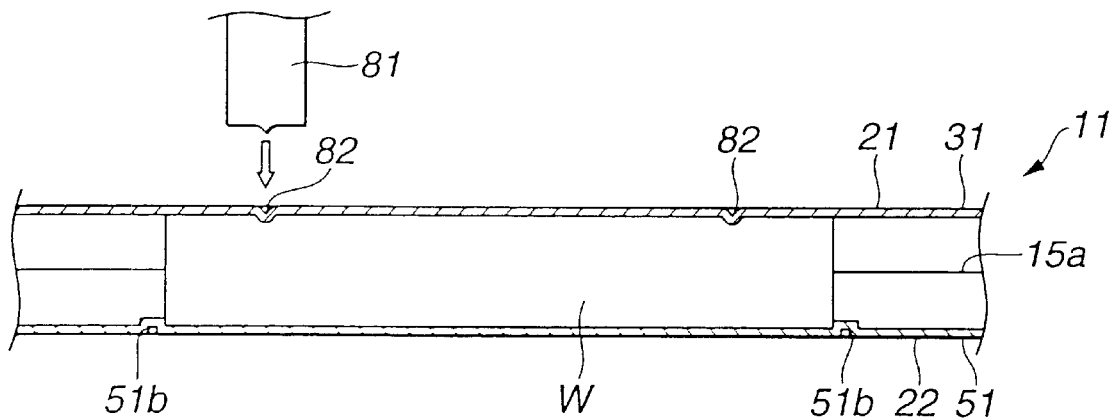
FIG. 4 is a schematic view showing another embodiment of the present invention.

By way of example, referring to FIG. 4, with the weight W held between the upper and lower shells 21, 22 and engaged between the weight positioning parts 51b, applying a punch or a jig to the upper shell 21, punched portions 82 may be formed in both the upper shell 21 and the weight W for fixing.

Figure 5:
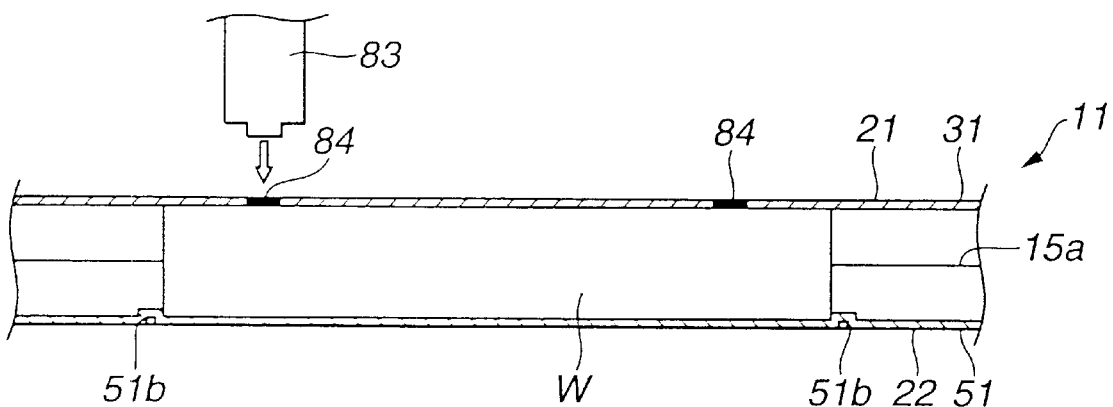
FIG. 5 is a view similar to FIG. 4, showing still another embodiment of the present invention.

Optionally, referring to FIG. 5, applying a welder 83 or a jig to the upper shell 21, spot-welded portions 84 may be created between the upper shell 21 and the weight W for fixing.

Figure 6:
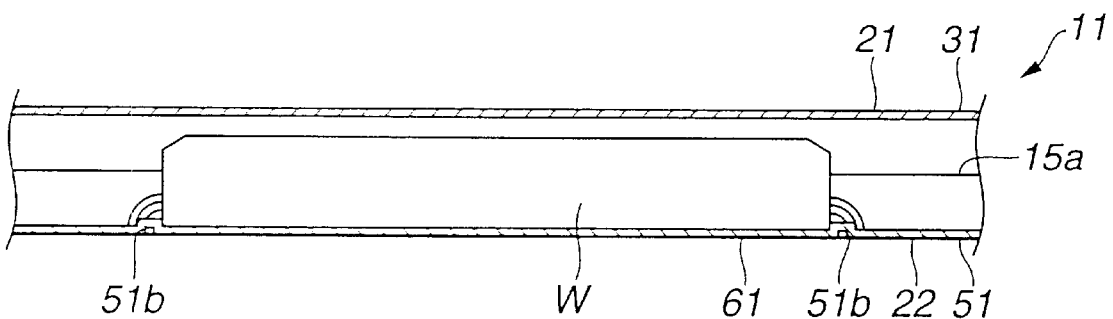
FIG. 6 is a view similar to FIG. 5, showing still another embodiment of the present invention.

Optionally, referring to FIG. 6, using an unillustrated jig, the weight W may be fillet welded to the weight positioning parts 51b or the base 61 of the lower shell 22. In the configuration in FIG. 6, the weight W is sized to incompletely fill the hollow A.

Figure 7:
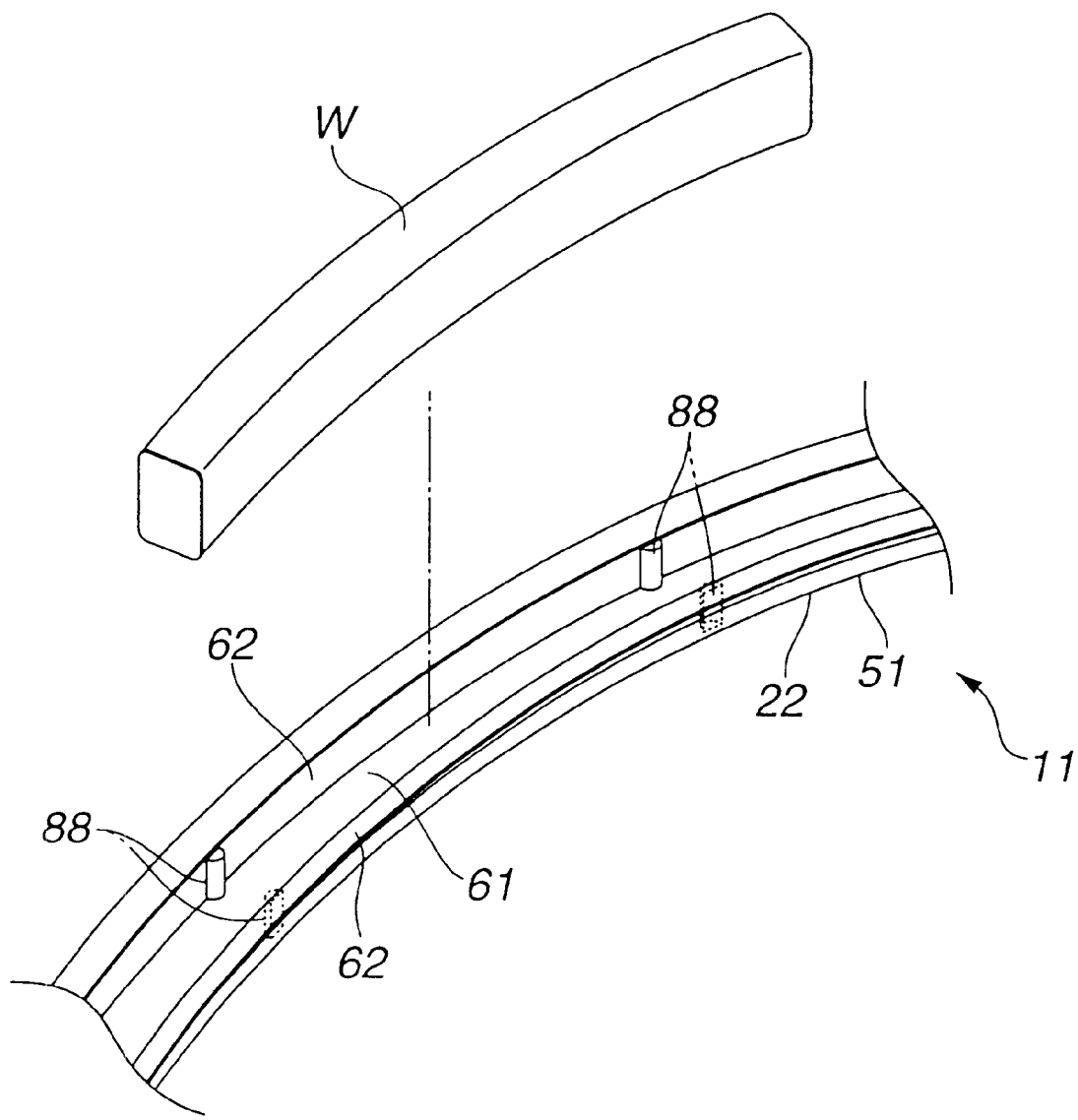
FIG. 7 is a fragmentary perspective view showing a further embodiment of the present invention.

Alternatively, referring to FIG. 7, a plurality of ribs 88 may be arranged to protrude inwardly pairwise from the vertical walls 62 of the lower shell 22, between which the weight W is press fitted for fixing. In this configuration, the lower shell 22 is held in a hemming mold, not shown, and the weight W is engaged therewith with expanding deformation of the vertical walls 62 restrained, and then the upper shell 21 is fixed to the lower shell 22, allowing easy and firm fixing of the weight W.

Figure 8:
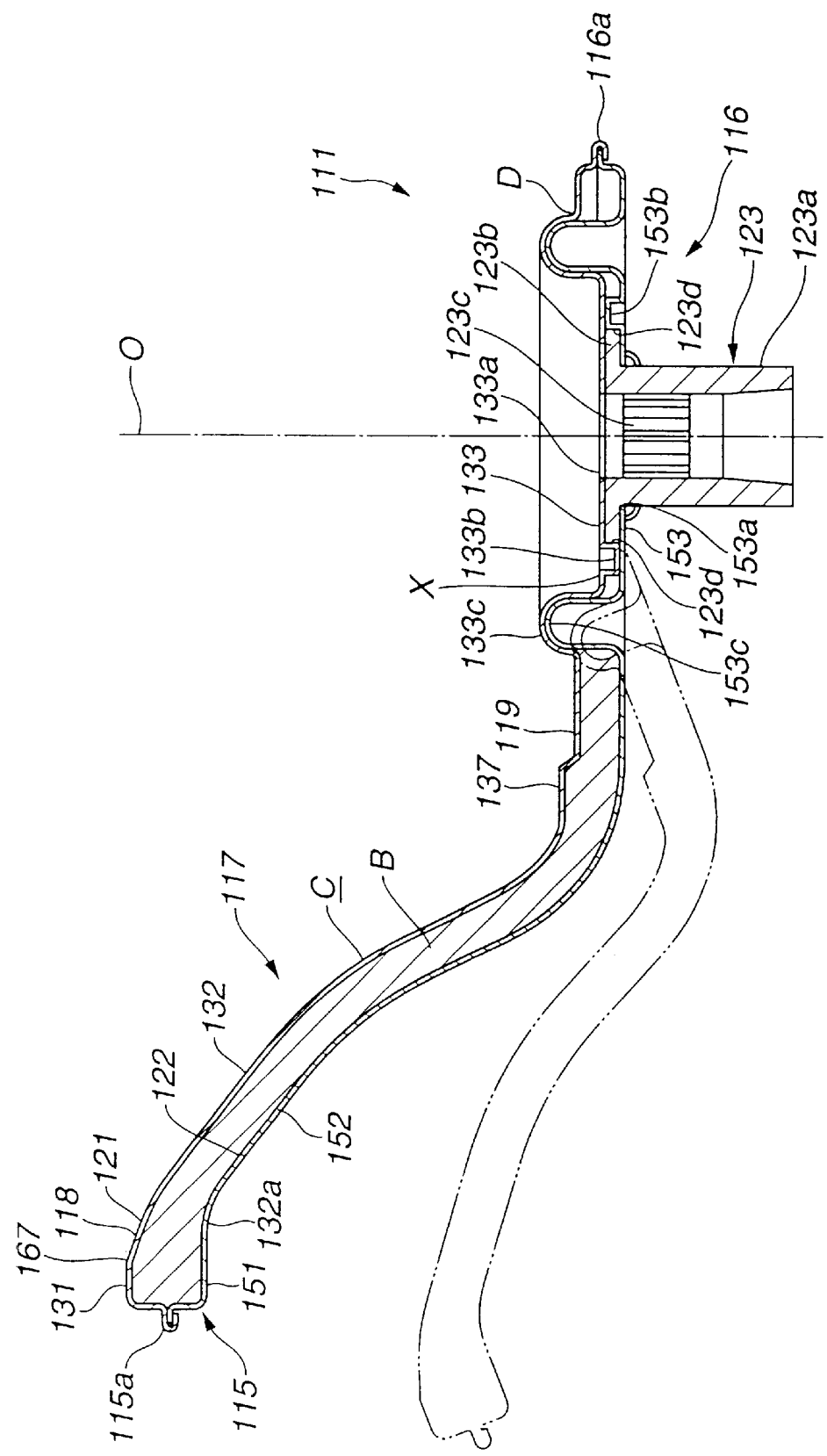
FIG. 8 is a sectional view taken along the line VIII—VIII in FIG. 10 and showing the other embodiment of the present invention.
Figure 9:
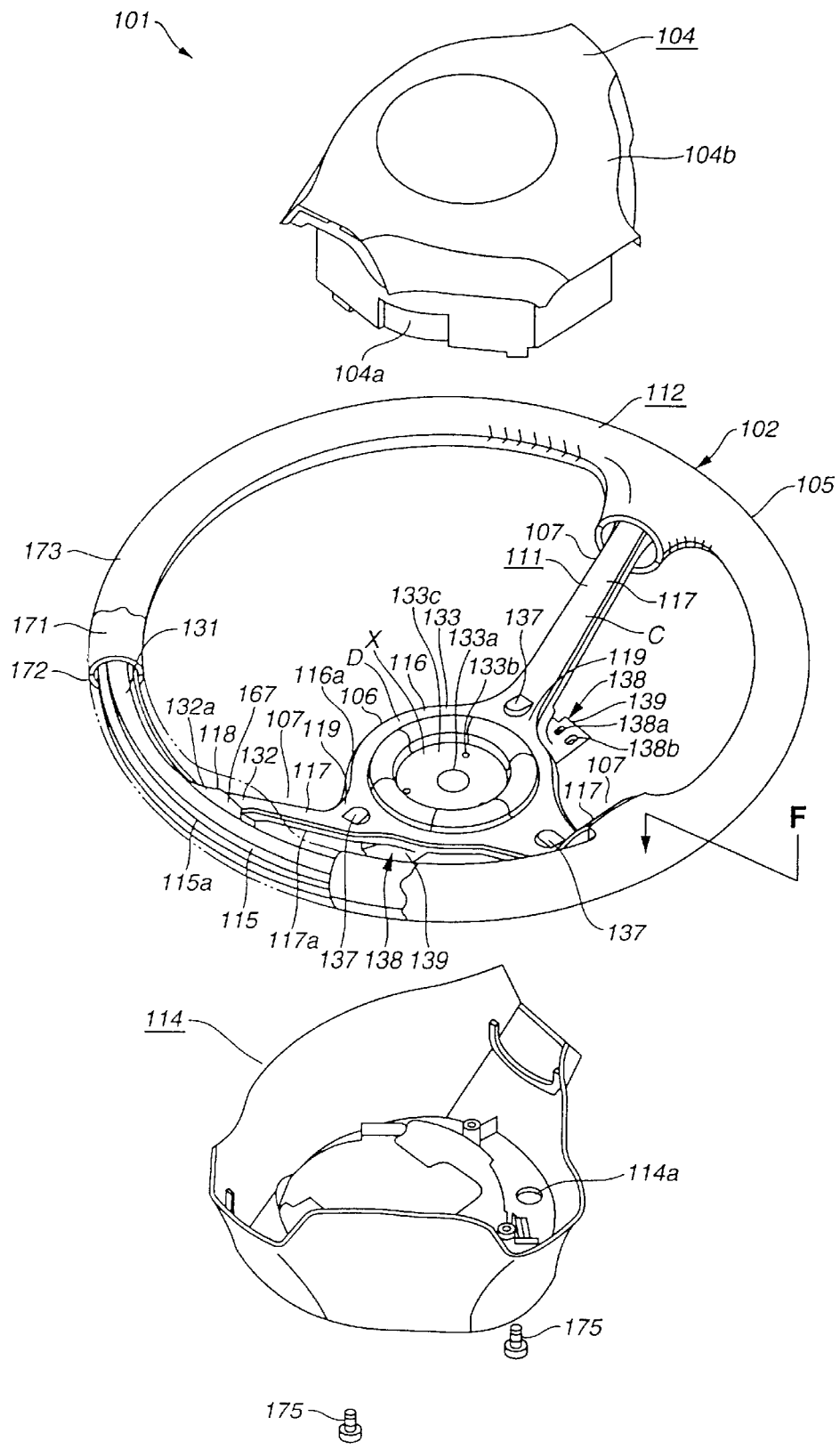
FIG. 9 is a view similar to FIG. 2, showing the steering wheel with a core bar in FIG. 8.

FIGS. 8–11B show the other embodiment of the present invention. Referring to FIG. 9, a steering wheel for an automotive vehicle, designated by reference numeral 101, comprises a main body 102, an airbag device or module 104 as a center pad mounted to the main body 102 on the side of a driver or an occupant, etc. The steering wheel 101 is mounted to a steering shaft or a course-guiding shaft arranged on the vehicle-body side. Typically, the steering shaft is provided in a vehicle in an inclined way. For the steering wheel 101, refer hereafter the occupant or airbag-device 104 side or the front side to as upper side, the side opposite to the occupant side, i.e. the vehicle-body or steering-shaft side or the reverse side to as lower side, the vehicular forward or front-glass side to as front side, and the vehicular backward or lower rearward side to as rear side. Refer also an axis of the steering shaft to as an operation axis O.

The steering-wheel main body 102 is substantially annular in entire shape, for example, and comprises a rim 105 called also grip or ring for holding operation, a boss 106 placed inside the rim 105, and a plurality of (three in this embodiment) spokes 107 for connecting the rim 105 and the boss 106. The steering-wheel main body 102 also comprises a core bar 111, a sheath 112 for partly covering the core bar 111, and a lower cover 114.

Figure 10:
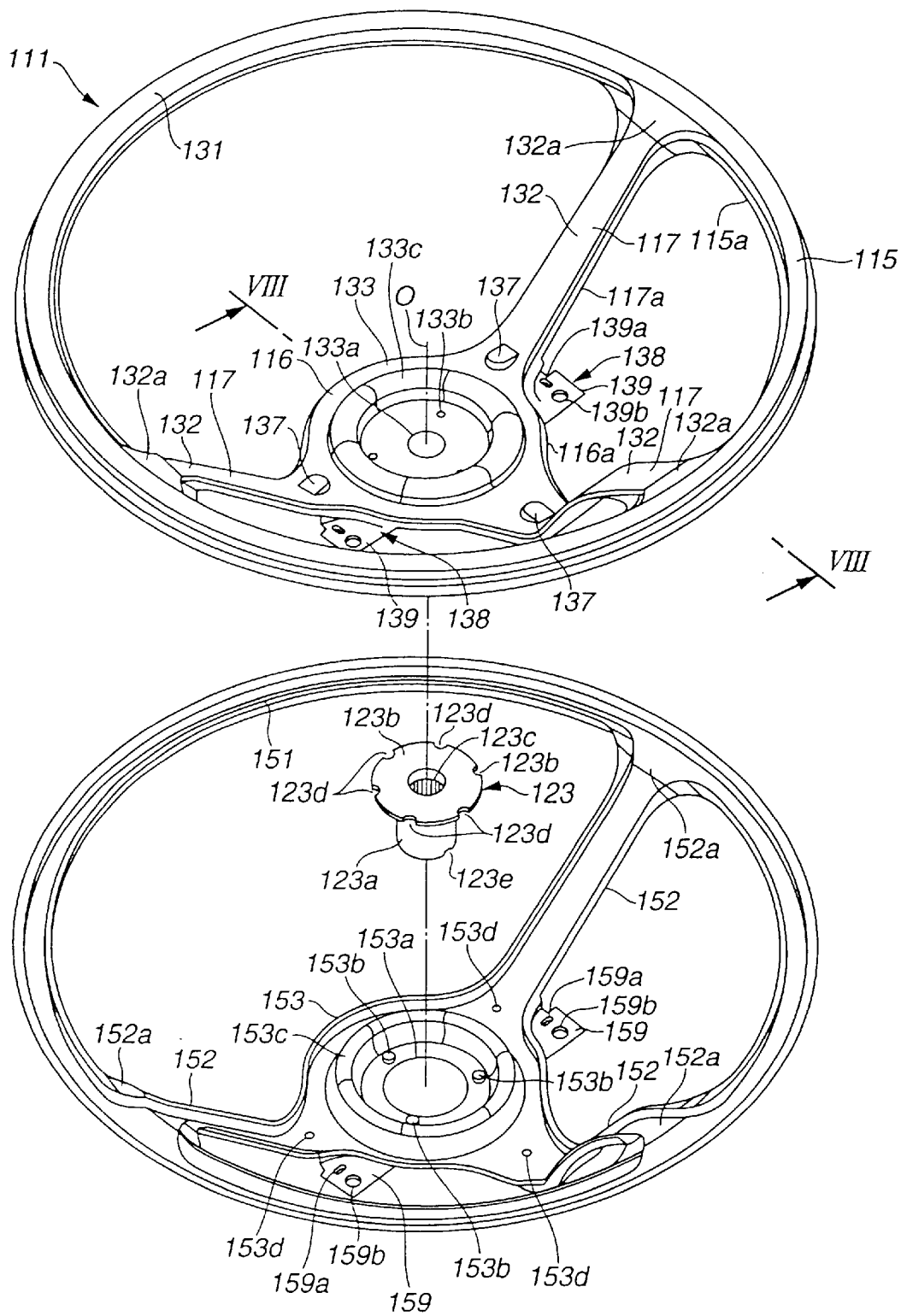
FIG. 10 is a view similar to FIG. 9, showing the core bar.

Referring to FIGS. 8–10, the core bar 111, which can be called wheel core bar, is of the shape corresponding to the entire shape of the steering-wheel main body 102, and comprises a rim core-bar portion 115, a boss core-bar portion or a boss plate portion 116 placed inside the rim core-bar portion 115, and a plurality of (three in this embodiment) spoke core-bar portions 117 for connecting the rim core-bar portion 115 and the boss core-bar portion 116. By combining an upper or first-half shell 121 facing the occupant and a lower or second-half shell 122 facing the vehicle body, an outer shell C is defined for the rim core-bar portion 115 and the spoke core-bar portion 117. A filling material is charged into a hollow formed inside the outer shell C to obtain a reinforcement B. A boss body 123 constituting a shaft fixing part is fixed to the boss core-bar portion 116 with the top partly placed inside a boss outer shell D for the boss core-bar portion 116. Refer hereafter a connection between the rim core-bar portion 115 and the spoke core-bar portion 117 to as an outside connection 118, and a connection between the boss core-bar portion 116 and the spoke core-bar portion 117 to as an inside connection 119.

The upper and lower shells 121, 122 are obtained by press forming of a steel plate, each being integrally formed by, e.g. a 0.7 mm thickness SPCE steel plate as deep drawn. The upper and lower shells 121, 122 are coupled to each other at a rim-edge coupling 115a along the outer and inner peripheries of the rim core-bar portion 115, a spoke-edge coupling 117a along both ends of the spoke core-bar portion 117, and a boss-edge coupling 116a along the outer periphery of the boss core-bar portion 116.

The upper shell 121 includes a rim top 131, spoke tops 132, and a boss top 133. A circular hole 33a is formed in the center of the boss top 133. A plurality of, e.g. three, protrusions 133b is equidistantly formed on the perimeter of a circle with the circular hole 133a as center so as to protrude downwardly. Moreover, a junction or a circular protrusion 133c having substantially U-shaped section is concentrically formed at the outer periphery of the circle with respect to the protrusion 133b so as to protrude upwardly. The inner periphery of the junction 133c is disposed lower than the outer periphery. Upwardly protruding seats 137 are formed at both sides and the rear of the boss top 133 so as to restrict the height of the airbag device 104.

The spoke tops 132 are extended upwardly inclinedly from both sides and the rear of the boss top 133. Each spoke top 132 is of the width roughly constant along the longitudinal direction, and includes, in the vicinity of the outside connection 118, an upper spoke core-bar large-diameter portion 132a having width smoothly continuously enlarged toward the outside connection 118. The rim top 131 is of the annular shape as viewed in plan, and can include, in the vicinity of the outside connection 118, an upper rim core-bar large-diameter portion having greater height than the other portion, as required. In the vicinity of the inside connections 119 formed at both sides of the boss top 133, brackets 139 are continuously integrated with the boss top 133 and the respective spoke tops 132 to constitute mounting seats 138. Each bracket 139 is shaped like a horizontal plate, and has pluralities of through holes 139a, 139b.

Figure 11A:
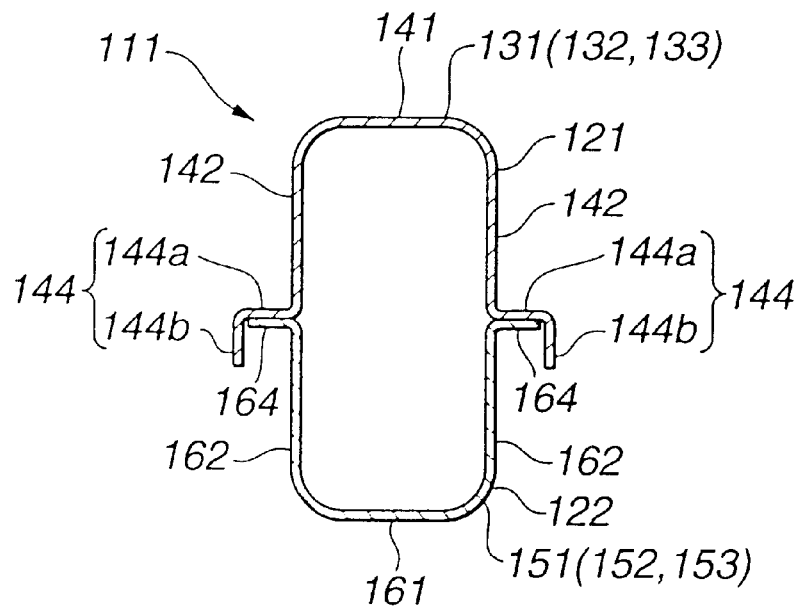
FIGS. 11A–11B are views similar to FIGS. 3A–3B, explaining the manufacturing process of the core bar.

Referring to FIG. 11A exemplarily illustrating the rim core-bar portion 115, an edge of each of the rim top 131, the spoke tops 132, and the boss top 133 includes a plate-like base 141 and vertical walls 142 extending downwardly from respective edges of the base 141. Continuously formed at a lower end of each vertical wall 142 is a plastically deformable embracement 144 which comprises a horizontal-plate-like upper flange 144a and a fastening 144b extending from an outer edge of the upper flange 144a.

In the similar way to the upper shell 121, the lower shell 122 includes a rim bottom 151, spoke bottoms 152, and a boss bottom 153. A circular hole 153a having larger diameter than that of the circular hole 133a of the boss top 133 is formed in the center of the boss bottom 153. A plurality of, e.g. three, protrusions 153b is equidistantly formed on the perimeter of a circle with the circular hole 153a as center so as to protrude upwardly. The protrusions 153b are disposed 60° offset with respect to the protrusions 133b of the boss top 133, respectively. Moreover, a circular junction 153c having substantially U-shaped section is concentrically formed at the outer periphery of the circle with respect to the protrusion 153b so as to protrude upwardly. For accommodation or engagement in the junction 133c of the boss top 133, the junction 153c of the lower shell 122 is of smaller outer diameter and larger inner diameter than those of the junction 133c. Holes 153d are formed in the vicinity of the respective inside connections 119, i.e. at both sides and the rear of the boss top 133 so as to correspond to the respective seats 137 of the boss top 133. A self-tapping screw, not shown, is meshed with each hole 153d. When forming the reinforcement B, the holes 153d can be used as an inlet for introducing a filling material such as polyurethane foam resin into the hollow inside the outer shell C.

The spoke bottoms 152 are extended upwardly inclinedly from both sides and the rear of the boss bottom 153. Each spoke bottom 152 is of the width roughly constant along the longitudinal direction, and includes, in the vicinity of the outside connection 118, a lower spoke core-bar large-diameter portion 152a having width smoothly continuously enlarged toward the outside connection 118. The rim bottom 151 is of the annular shape as viewed in plan, and can include, in the vicinity of the outside connection 118, a lower rim core-bar large-diameter portion having greater height than the other portion, as required. In the vicinity of the inside connections 119 formed at both sides of the boss top 133, brackets 159 are continuously integrated with the boss bottom 153 and the respective spoke bottoms 152 to constitute the mounting seats 138. Each bracket 159 is shaped like a horizontal plate, and has a plurality of through holes 159a, 159b.

Referring to FIG. 11A, an edge of each of the rim bottom 151, the spoke bottom 152, and the boss bottom 153 includes a plate-like base 161 and vertical walls 162 extending upwardly from respective edges of the base 161. A horizontal-plate-like flange 164 is continuously formed at an upper end of each vertical wall 162. The length between outer ends of the flanges 164, 164 of the lower shell 122 is smaller than that between inner side faces of the fastenings 144b, 144b of the upper shell 121.

As shown in FIG. 10, the boss body 123 is formed by applying an iron material to forging, casting, or numerically controlled (NC) machining using an NC machine tool. The boss body 123 comprises an integration of a roughly cylindrical-shaped tube 123a and a roughly disc-shaped boss flange 123b obtained, for example, by cutting of an S15C-equivalent steel material. A protrusion or a serration 123c is formed at the inner periphery of the tube 123a to mesh with an undulated protrusion formed at the outer periphery of a head of the steering shaft. Six semicircular notches 123d are equidistantly formed at the outer periphery of the boss flange 123b. Moreover, a cancellation or a rectangular recess 123e is formed at a lower end of the tube 123a to engage with a canceling pin for automatically returning an operation lever for a direction-indicator lamp mounted to a steering column, not shown.

The core bar 111 is constructed by butting the upper and lower shells 121, 122 with the boss body 123 held therebetween. The reinforcement B is provided in substantially the whole volume of the outer shell C of the rim core-bar portion 115 and the spoke core-bar portion 117 comprised of the upper and lower shells 121, 122 and in the boss outer shell D at the outer periphery of the junctions 133c, 153c. The reinforcement B is formed, e.g. out of polyurethane foam resin with, preferably, higher hardness and lower specific gravity. This embodiment uses low-density and low-flexibility resin with 0.4 or less specific gravity.

In the manufacturing process of the core bar 111, the boss body 123 is disposed between the boss top 133 of the upper shell 121 and the boss bottom 153 of the lower shell 122, and the upper and lower shells 121, 122 are placed one upon another. At this time, the tube 123a of the boss body 123 is protruded downwardly from the circular hole 153a of the boss bottom 153, and the boss flange 123b is held between the boss top 133 and the boss bottom 153. Moreover, the protrusions 133b, 153b are alternately engaged with the six notches 123d of the boss flange 123b from above and below, carrying out positioning of the upper and lower shells 121, 122 and the boss body 123 in the direction of rotation.

Figure 11B:
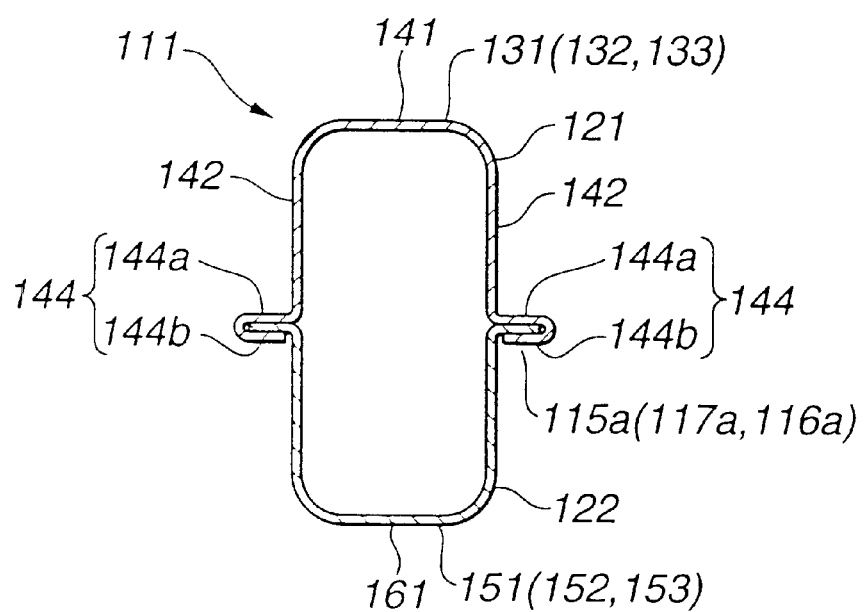

Referring to FIG. 11A, with the upper and lower shells 121, 122 placed one upon another, each flange 164 arranged along an edge of the lower shell 122 is received in the embracement 144 arranged along an edge of the upper shell 121. Then, the fastening 144b of the embracement 144 is subjected to hemming to couple the upper and lower shells 121, 122. Specifically, by hemming using an automatic machine, the fastening or vertical wall 144b is inclined inwardly, then bent and deformed by applying a force thereto up to the lower face of the flange 164 of the lower shell 122 so as to envelop the flange 164 as shown in FIG. 11B, coupling the upper and lower shells 121, 122. The rim core-bar portion 115 and the spoke core-bar portion 117 form a tube with closed section to define the hollow therein. For circumferential detent for upper and lower shells 121, 122, the rim core-bar coupling 115a of the rim core-bar portion 115 can be formed with concavities or engagements obtained by punching at predetermined intervals.

With the boss core-bar portion 116, the upper and lower junctions 133c, 153c are closely engaged to receive one in another, and are fixed without being joined with each other so as to form a middle weakness X which is deformable by an external force and placed inside the junctions 133c, 153c and outside the boss body 123. The section of the weakness X is of smaller height and larger width, i.e. smaller in height along the direction of the operation axis O and larger in width in the direction perpendicular to the direction of the operation axis O compared with the section of the hollow defined by the rim core-bar portion 115 and the spoke core-bar portion 117. The boss body 123 is fixed to the lower shell 122 in predetermined positions by spot welding or the like. The boss body 123 can be fixed to both of the upper and lower shells 121, 122 instead of being fixed to one of them.

Moreover, as shown in FIG. 9, a spoke core-bar large-diameter portion 167 is configured in the spoke core-bar portion 117, which is continuously connected to the outside connection 118 to which the rim core-bar portion 115 and the spoke core-bar portion 117 are coupled, and has larger sectional area with larger width. And a rim core-bar large-diameter portion can be configured in the rim core-bar portion 115, as required, which is continuously connected to the outside connection 118 and has larger sectional area with greater height.

Furthermore, the upper and lower brackets 139, 159 are aligned and placed one upon another to obtain the mounting seat 138. The mounting seat 138 is formed with a positioning hole 138a communicating with the through holes 139a, 159a, and a mounting hole 138b communicating with the through holes 139b, 159b.

Reaction liquid, which will form polyurethane foam with 0.4 specific gravity and no flexibility, is injected into the outer shell C through the three holes 153d to obtain the reinforcement B. The reaction liquid is composed of polyol and isocyanate which are separately stored in respective tanks, not shown, and supplied to a mixing head, not shown, for mixing immediately before injection. The reaction liquid is of the low viscosity, and is prepared to provide a long reaction time. When injecting the reaction liquid, the core bar 111 is placed with the lower side up, i.e. the holes 53d up. Preparation is carried out such that the reaction liquid starts to foam while flowing down spontaneously up to the rim core-bar portion 115. Time from injection to foaming is set, for example, at 5 to 20-odd seconds.

The sheath 112 and the lower cover 114 are mounted to the core bar 111 as shown in FIG. 9 so as to obtain the steering-wheel main body 102. The sheath 112 includes upper and lower rim covers 171, 172 which partly envelop the rim core-bar portion 115 and the spoke core-bar portion 117. The upper and lower rim covers 171, 172 are obtained by injection molding of polypropylene resin, for example. Moreover, the whole of the rim covers 171, 172 is covered with a skin material 173 of, e.g. natural leather such as cowhide or artificial leather wound and seamed at the outer periphery, as required.

The lower cover 114 is integrally formed, e.g. out of synthetic resin to have the shape allowing partial covering of the boss core-bar portion 116 and the spoke core-bar portion 117. The lower cover 114 is mounted to the lower shell 122 by inserting the self-tapping screws into the respective through holes from below and engaging them with the respective holes 153d of the lower shell 122. Each seat 137 of the upper shell 121 facing the corresponding hole 153d of the lower shell 122 serves to prevent a threaded part of the self-tapping screw from abutting on the upper shell 121 even if the threaded part protrudes upwardly from the hole 153d. Moreover, the lower cover 114 has working through holes 114a facing the mounting seats 138 of the core bar 111.

The airbag device 104 comprises a metal base plate 104a, an unillustrated bag-like airbag and inflator for supplying gas thereto, mounted to the base plate 104a, and a cover 104b concealing the airbag and capable of being broken by the pressure provided when the airbag develops. The base plate 104a includes a pair of nut portions having downward tapped hole, and positioning protrusions placed in the proximity of the nut portions. The airbag device 104, which is placed on the boss core-bar portion 116 of the core bar 111, has the base plate 104a abutting on the seats 137 of the upper shell 121 for positioning in the height direction, and positioning protrusions inserted in the respective positioning holes 138a of the mounting seats 138 for positioning in the horizontal or cross direction. With the upper and lower through holes 139a, 159a constituting the positioning hole 138a, the through hole 159a of the lower shell 122 is larger than the through hole 139a of the upper shell 121 to prevent the lower shell 122 from contacting and interfering with the positioning protrusion inserted in the through hole 139a. By engaging bolts 175 inserted from below through the working through holes 114a with the respective nut portions of the base plate 114a through the mounting holes 138b of the mounting seats 138, the airbag device 104 is fixed to the steering-wheel main body 102 to obtain the steering wheel 101.

Next, operation of the illustrative embodiment is described. In the event of vehicular collision, the airbag device 104 is operated to develop the airbag in front of the driver or occupant so as to restrain him or her thrown forward, alleviating a collision impact to be applied.

In the event that the occupant collides with the steering wheel 101 regardless of actuation of the airbag device 104, the core bar 111 can be deformed or self-aligned as illustrated by the two-dot chain line in FIG. 8, absorbing a collision impact. At this time, the core bar 111 provides a greater strength, since the outer periphery of the boss core-bar portion 116 is reinforced by the junctions 133c, 153c, the rim core-bar portion 115 and the spoke core-bar portion 117 continuously connecting the junctions 133c, 153c form a tube with closed section and is reinforced with the reinforcement B, and the embracement coupling structure provides a rib structure. Moreover, the spoke core-bar large-diameter portion 167 and, rim core-bar large-diameter portion, as required, having increased sectional area are formed at the outside connection 118 to which the rim core-bar portion 115 and the spoke core-bar portion 117 are coupled, and the spoke core-bar large-diameter portion 167 is shaped like a soft sector to increase the sectional area, allowing restrained concentration of a stress on the outside connection 118. This results in excellent shape conservationability of the steering-wheel main body 102 in its entirety. Then, an outer peripheral edge of the boss flange 123b of the boss body 123 of the boss core-bar portion 116 functions as the weakness X, which is deformed intensively to change the angle at the base, as it were, of the spoke core-bar portion 117 with the entire shape conserved with respect to an external force, absorbing a collision impact, achieving excellent impact absorbing characteristics for the core bar 111.

By way of example, the load-stroke characteristics of the core bar 111 when depressing an F or zero point as shown in FIG. 9 reveal that the core bar 111 can provide excellent impact absorbing characteristics similar to those for the core bar of magnesium alloy, wherein a rising curve is traced in smaller stroke area, and a flat curve is traced in a larger stroke area.

In this embodiment, the first and second half shells 121, 122 are coupled to each other to form the rim core-bar portion 115 and the spoke core-bar portion 117, i.e. the outer shell C with hollowed inside, obtaining lightweight core bar 111 with restrained manufacturing cost. Moreover, the reinforcement B is formed inside the outer shell C by filling of a filling material. Such composite structure of the metal outer shell and the resin reinforcement allows easy enhancement of the resonance frequency with restrained weight increase to achieve improvement in the resonance characteristics, i.e. optimization of the resonance frequency, obtaining restrained vibrations, leading to improved operation feel. Moreover, this composite structure can provide additional strength to the outer shell C, restraining crush deformation thereof from inside, resulting in enhanced strength. Thus, the core bar 111 can be obtained with small weight and sufficient strength. Then, the thickness of a steel plate for the first and second half shells 121, 122 can be reduced, achieving a further reduction in weight. By way of example, the core bar 111 has about ¼ mass with respect to a conventional equivalent obtained by bending and welding an iron bar material. This mass is roughly equal to that of an equivalent of magnesium alloy.

The reinforcement B is readily reduced in specific gravity by using a foaming filling material. This implies a weight reduction while maintaining the strength, resulting in easy achievement of an improvement in both the resonance characteristics and the strength.

The thickness of a steel plate for the upper and lower shells 121, 122 is preferably 0.8 mm or less, which can readily provide a mass close to that of a lightweight alloy core bar with equivalent strength. More preferably, the thickness is between or equal to 0.5 mm and 0.7 mm, which can provide a compromise of a weight reduction and securing of the strength.

A material for the reinforcement B is not limited to polyurethane resin, and may be various materials with smaller specific gravity than the outer shell C, such as thermoplastic resin, thermosetting resin, or non-resin material. Examples of the material are polyethylene, polystyrene, and polypropylene.

In the illustrative embodiment, liquid polyurethane is injected to fully form the reinforcement B along the inside shape of the outer shell C without any clearance. Optionally, when using polypropylene resin, an injection-molded part can be preformed having the inside shape similar to that of the outer shell C of the core bar 111 or greater in height than the outer shell C, and be held between the upper and lower shells 121, 122 at assembling. Moreover, when using polypropylene resin, an injection-molded part can be formed to continuously or discontinuously be greater than that of the outer shell C, and be pressed between the upper and lower shells 121, 122 by applying heat to compress the foam structure of polypropylene resin, obtaining integration with the upper and lower shells 121, 122 along the inside shape of the outer shell C with no or slight clearance.

In each of the illustrative embodiments, the steering wheel can be constructed otherwise. By way of example, the number of spokes or spoke core-bar portions may be one, two, and four or more in place of three. Furthermore, without using a preformed member, the sheath for covering the core bar may be a member obtained by insert molding by injecting resin into a mold with the core bar disposed therein.

Moreover, the embracement is included with the upper shell, whereas the flange is included with the lower shell. Optionally, the embracement may be included with the lower shell, whereas the flange may be included with the upper shell.

Moreover, in place of a continuous annulus, the junction may be in the form of a discontinuous annulus having intermittent vacancies for communication between the inner and outer peripheries. This allows adjustment of the deformation characteristics for the boss core-bar portion.

The entire contents of Japanese Patent Applications 2000-095936 and 2000-095937 are incorporated hereby by reference.

What is claimed is:

1. A core bar for a steering wheel mounted to a steering shaft, comprising:

a first half shell;

a second half shell coupled to the first half shell, each half shell comprising a boss portion coupled to the steering shaft, a rim portion, and a spoke portion interposed between the boss portion and the rim portion; and an insertion received in a hollow space defined by the first and second half shells the insertion occupying a predetermined part of the hollow space.

2. The core bar as claimed in claim 1, wherein the insertion comprises a weight arranged in the hollow space at at least one of the boss portion, the rim portion, and the spoke portion.

3. The core bar as claimed in claim 2, wherein the weight is of an external shape corresponding to an internal shape of the hollow space.

4. The core bar as claimed in claim 3, wherein the weight is arranged in the hollow space at the rim portion.

5. The core bar as claimed in claim 3, wherein the weight is arranged in the hollow at the spoke portion.

6. The core bar as claimed in claim 3, wherein the weight is arranged in the hollow at the boss portion.

7. The core bar as claimed in claim 4, wherein the weight is placed in the most distant position from a connection between the rim portion and the spoke portion.

8. The core bar as claimed in claim 1, wherein the first and second half shells comprise a steel plate of 0.8 mm or less thickness.

9. The core bar as claimed in claim 1, wherein the insertion has a predetermined length smaller than a length of the hollow space.

10. The core bar as claimed in claim 1, wherein the insertion is made of a material heavier than said shells.

11. The core bar as claimed in claim 1, wherein the insertion is made of metal.

12. The core bar as claimed in claim 11, wherein the metals is selected from the group consisting of lead, nickel, copper and iron.

13. A core bar for a steering wheel mounted to a steering shaft, comprising:

a first half shell;

a second half shell coupled to the first half shell, each half shell comprising a boss portion coupled to the steering shaft, a rim portion, and a spoke portion interposed between the boss portion and the rim portion; and a weight received in a hollow space formed between the first and second half shells at at least one of the boss portion, the rim portion, and the spoke portion, the weight occupying a predetermined part of the hollow space.

14. The core bar as claimed in claim 13, wherein the weight has a predetermined length smaller than a length of the hollow space.

15. The core bar as claimed in claim 13, wherein the weight is made of a material heavier than said shells.

16. The core bar as claimed in claim 13, wherein the weight is made of metal.

17. The core bar as claimed in claim 16, wherein the metal is selected from the group consisting of lead, nickel, copper and iron.

* * * * *